United States Patent
Tanabe et al.

(10) Patent No.: US 11,469,422 B2
(45) Date of Patent: Oct. 11, 2022

(54) PLATE, ELECTRODE ASSEMBLY, AND ENERGY STORAGE DEVICE

(71) Applicant: GS Yuasa International Ltd., Kyoto (JP)

(72) Inventors: Morito Tanabe, Kyoto (JP); Kohei Tsujita, Kyoto (JP); Yuta Osugi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 19 days.

(21) Appl. No.: 16/640,668

(22) PCT Filed: Nov. 22, 2018

(86) PCT No.: PCT/EP2018/082207
§ 371 (c)(1),
(2) Date: Feb. 20, 2020

(87) PCT Pub. No.: WO2019/105838
PCT Pub. Date: Jun. 6, 2019

(65) Prior Publication Data
US 2020/0358105 A1    Nov. 12, 2020

(30) Foreign Application Priority Data
Nov. 29, 2017    (JP) .............................. JP2017-229556

(51) Int. Cl.
*H01M 4/66* (2006.01)
*H01M 50/46* (2021.01)

(52) U.S. Cl.
CPC .......... *H01M 4/667* (2013.01); *H01M 4/662* (2013.01); *H01M 4/663* (2013.01); *H01M 50/46* (2021.01)

(58) Field of Classification Search
CPC ...... H01M 50/46; H01M 4/663; H01M 4/667; H01G 11/28
See application file for complete search history.

(56) References Cited

U.S. PATENT DOCUMENTS

2013/0048340 A1    2/2013  Bando et al.
2013/0089781 A1*   4/2013  Miyazaki ............... H01G 11/28
                                                    429/211

(Continued)

FOREIGN PATENT DOCUMENTS

EP    2 426 773 A2    3/2012
JP    H11-213969 A    8/1999

(Continued)

OTHER PUBLICATIONS

European Office Action, dated Feb. 18, 2021, in European Application No. 18 812 091.9-1108.

(Continued)

*Primary Examiner* — Stephan J Essex
(74) *Attorney, Agent, or Firm* — McGinn I.P. Law Group, PLLC.

(57) ABSTRACT

A plate includes a current collector, an intermediate layer layered on the current collector, and an active material layer layered on the intermediate layer. The intermediate layer contains conductive particles and insulating particles. At least a portion of an end edge of the intermediate layer is not covered with the active material layer. The intermediate layer hays a higher mass content of the insulating particles in a region not covered with the active material layer than that in a region covered with the active material layer.

20 Claims, 5 Drawing Sheets

(56) References Cited

U.S. PATENT DOCUMENTS

| | | | |
|---|---|---|---|
| 2013/0164614 A1* | 6/2013 | Uemura | C09D 5/24 |
| | | | 429/211 |
| 2014/0011064 A1 | 1/2014 | Matsuda et al. | |
| 2014/0072877 A1 | 3/2014 | Araki et al. | |
| 2015/0147624 A1 | 5/2015 | Yamafuku et al. | |
| 2015/0213967 A1 | 7/2015 | Yokouchi et al. | |
| 2016/0093859 A1* | 3/2016 | Kawaguchi | H01M 50/46 |
| | | | 429/131 |
| 2017/0187036 A1* | 6/2017 | Endo | H01M 10/0585 |

FOREIGN PATENT DOCUMENTS

| | | |
|---|---|---|
| JP | 2013-206743 A | 10/2013 |
| JP | 2014-075335 A | 4/2014 |
| JP | 2016-012484 | 1/2016 |
| JP | 2016-066454 A | 4/2016 |
| WO | WO 2014/034113 A1 | 3/2014 |

OTHER PUBLICATIONS

International Search Report (ISR) (PCT Form PCT/SA/210), in PCT/EP2018/082207, dated Feb. 19, 2019.

* cited by examiner

PLATE, ELECTRODE ASSEMBLY, AND ENERGY STORAGE DEVICE

TECHNICAL FIELD

The present invention relates to a plate, an electrode assembly, and an energy storage device.

BACKGROUND ART

A chargeable and dischargeable energy storage device (secondary battery) is used for various devices including mobile phones and electric vehicles. In recent years, an energy storage device that is smaller and has larger electric capacity (larger energy density) is being required along with increased demands for high power and high performance of these devices.

An energy storage device that includes an electrode assembly formed by alternately layering a positive electrode plate (positive plate) and a negative electrode plate (negative plate) with an electrically insulating separator interposed therebetween is widely used, wherein the positive electrode plate includes a current collector and a positive active material layer formed on a surface of the current collector, and the negative electrode plate includes a current collector and a negative active material layer formed on a surface of the current collector. In such an energy storage device, thinning the separator is effective to increase the electric capacity per unit volume of the device. Therefore, an energy storage device is in practical use that includes a separator formed of a porous resin film.

In the energy storage device including the separator formed of the resin film, a rise in temperature of an electrode assembly that does not occur in normal use but is caused by some factors is likely to cause contraction of the separator by heat, bringing the positive electrode plate into direct contact with a negative electrode plate. Contact of a current collector of a plate with a counter plate (a current collector or an active material layer) makes electric resistance smaller even than that when active material layers are in contact with each other, so that very large short-circuit current possibly flows to cause excessive heat generation. The plate normally has, for connecting itself to an external terminal, a tab formed by partially extending the current collector in a band shape such that the current collector projects from an active material layer. Therefore, this tab is highly likely to get contact with the counter plate at the time of a rise in temperature.

The plate sometimes includes a so-called intermediate layer to improve adhesiveness between the current collector and the active material layer. There is proposed extending the intermediate layer to a region, such as the tab, of the current collector where no active material layer is layered, to prevent the direct contact of the current collector with the counter plate. The current collector contacts with the counter plate, with the intermediate layer interposed between the current collector and the counter plate, resulting in an increased short-circuit resistance (for example, see JP-A-2014-75335).

PRIOR ART DOCUMENT

Patent Document

Patent Document 1: JP-A-2014-75335

SUMMARY OF THE INVENTION

Problem to be Solved by the Invention

As described in the patent document, it is necessary to increase the electric resistance of the intermediate layer when increasing an effect of inhibiting short-circuit current by the resistance of the intermediate layer, whereas an increase in electric resistance of the intermediate layer also increases the electric resistance between the current collector and the active material layer. Therefore, in the configuration described in the patent document, an increase in the effect of inhibiting short-circuit current increases internal loss by the electric resistance of the intermediate layer to possibly lower energy efficiency of the energy storage device.

Under the circumstances described above, an object of the present invention is to provide a plate, an electrode assembly, and an energy storage device that have a large effect of inhibiting short-circuit current between the plate and a counter plate.

Means for Solving the Problem

A plate according to one aspect of the present invention that has been made to solve the problem includes a current collector, an intermediate layer layered on the current collector, and an active material layer layered on the intermediate layer, wherein the intermediate layer contains conductive particles and insulating particles, wherein at least a portion of an end edge of the intermediate layer is not covered with the active material layer, and wherein the intermediate layer has a higher mass content of the insulating particles in a region not covered with the active material layer than that in a region covered with the active material layer.

Advantage of the Invention

A plate according to one aspect of the present invention has a large effect of inhibiting short-circuit current between the plate and a counter plate.

MODES FOR CARRYING OUT THE INVENTION

A plate according to one aspect of the present invention includes a current collector, an intermediate layer layered on the current collector, and an active material layer layered on the intermediate layer, the intermediate layer containing conductive particles and insulating particles, the intermediate layer having no active material layer layered on at least a portion of an end edge thereof, and the intermediate layer having a higher mass content of the insulating particles in a region that has no active material layered thereon than that in a region that has the active material layer layered thereon.

In the plate, the intermediate layer layered between the current collector and the active material layer has a higher mass content of the insulating particles in the region having no active material layered thereon than that in the region having the active material layer layered thereon, so that the intermediate layer has larger electric resistance in the region having no active material layered thereon than that in the region having the active material layer layered thereon. Therefore, the plate never increases internal resistance of an energy storage device formed using the plate but increases short-circuit resistance during contact between plates to be capable of effectively inhibiting short-circuit current.

In the plate, it is preferred that the conductive particles be a carbon material and the insulating particles be alumina. This composition is considered to easily increase the difference in dispersibility between the conductive particles and the insulating particles in a coating solution used for forming the intermediate layer by coating and drying. This makes it easy to increase the mass content of the insulating particles in the end edge of the intermediate layer to achieve easy production of the plate.

In the plate, the intermediate layer preferably further contains an aggregation inhibitor for adjusting aggregation of the insulating particles. This composition is capable of making the dispersibility of the insulating particles appropriate in the coating solution used for forming the intermediate layer by coating and drying. This makes it easy to increase the mass content of the insulating particles in the end edge of the intermediate layer to achieve easy production of the plate.

An electrode assembly according to another aspect of the present invention includes the plate, a counter plate that is opposite to the plate and has a different polarity from a polarity of the plate, and a separator interposed between the plate and the counter plate. The electrode assembly includes the plate that has a high mass content of the insulating particles in the region having no active material layered thereon, to be capable of effectively inhibiting short-circuit current during contact between the plate and the counter plate.

An energy storage device according to another aspect of the present invention includes the electrode assembly and a case for housing the electrode assembly. The energy storage device includes the electrode assembly to be capable of effectively inhibiting short-circuit current during contact between the plate and the counter plate.

Hereinafter, an embodiment of the present invention is described in detail with appropriate reference to drawings.

Figure 1:
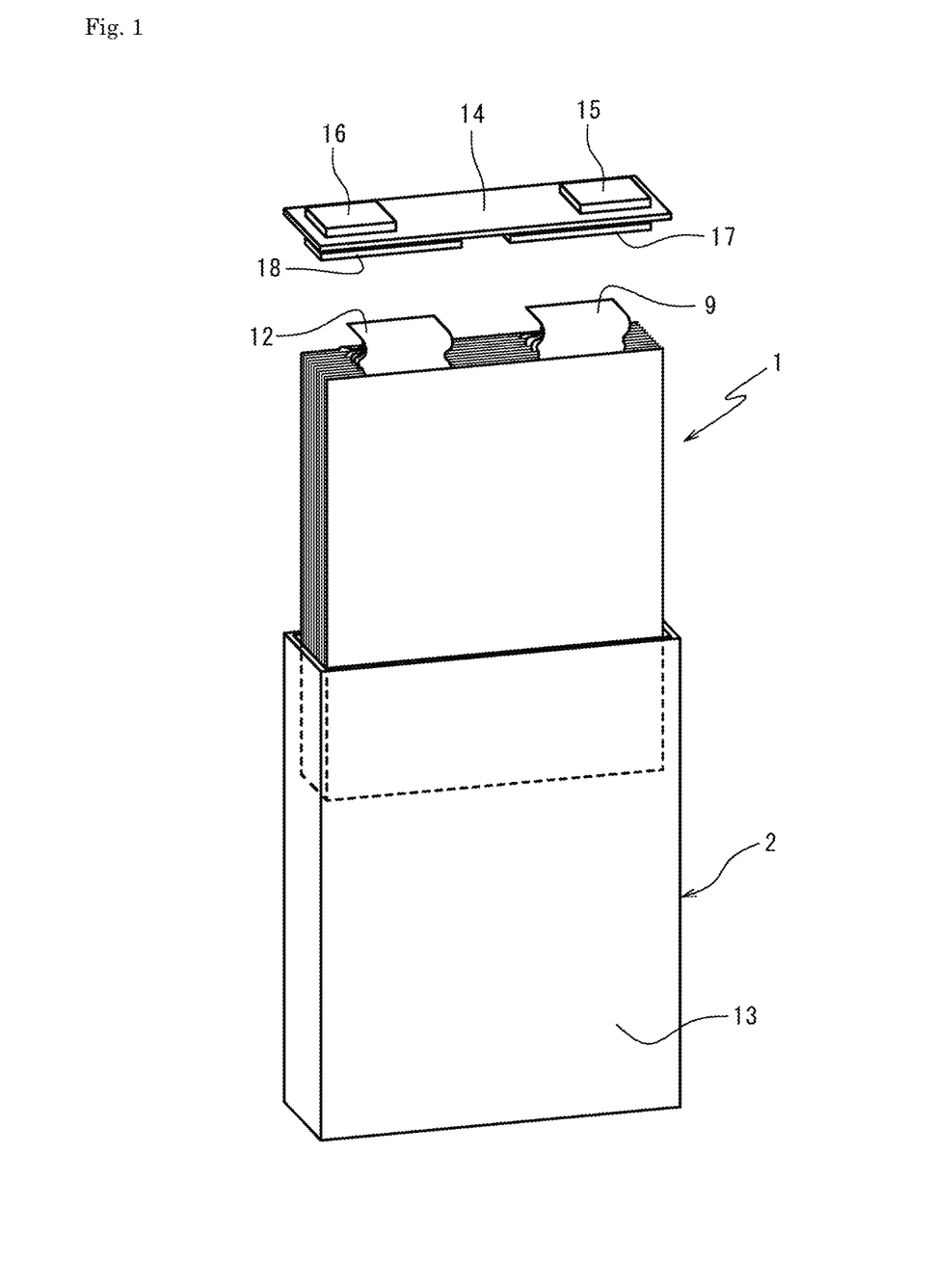
FIG. 1 is a schematic exploded perspective view of an energy storage device according to one embodiment of the present invention.

FIG. 1 shows a configuration of an energy storage device according to one embodiment of the present invention. The energy storage device includes an electrode assembly 1 and a case 2 for housing the electrode assembly 1. The case 2 has the electrode assembly 1 as well as an electrolyte solution sealed therein. The electrode assembly 1 itself represents one embodiment of a layered electrode assembly according to the present invention.

Figure 2:
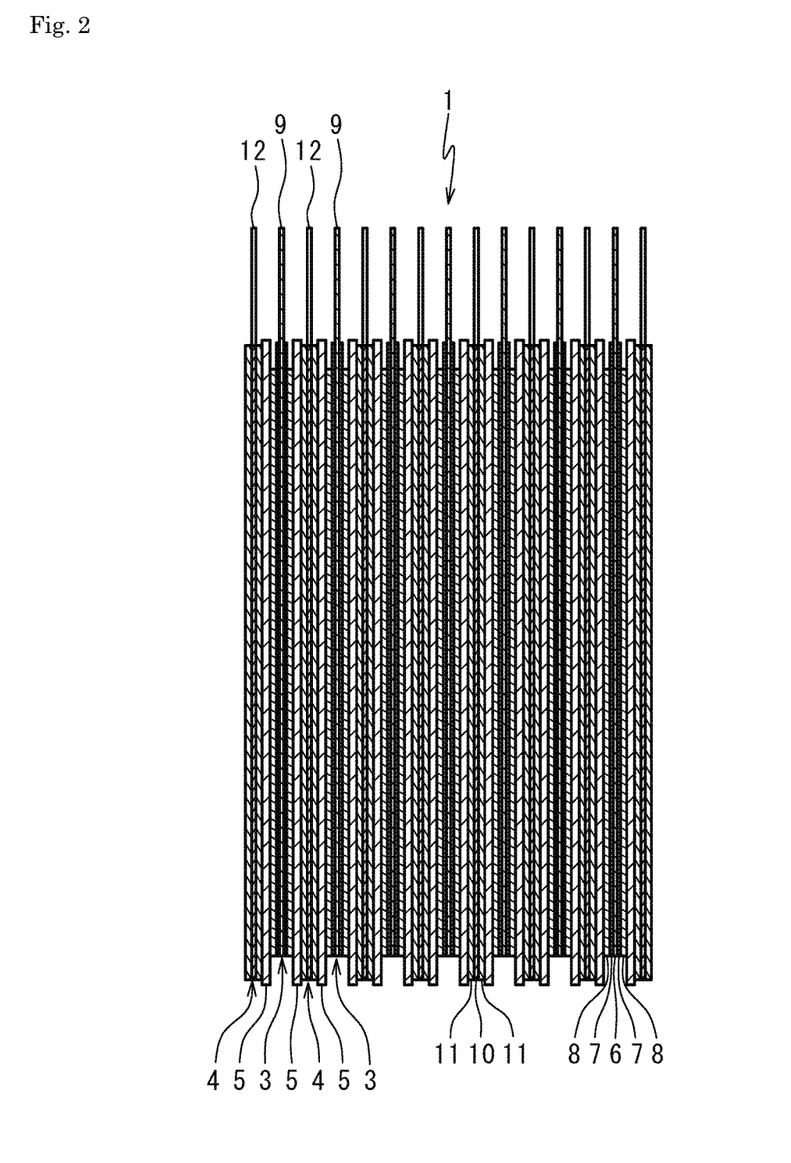
FIG. 2 is a schematic sectional view of an electrode assembly of the energy storage device in FIG. 1.

The electrode assembly 1 includes, as shown in FIG. 2, a plurality of positive electrode plates 3, a plurality of negative electrode plates 4 as counter plates that are alternately layered with the positive electrode plates 3 so as to be opposite to the positive electrode plates and that have a different polarity from a polarity of the positive electrode plates, and a plurality of separators 5 each interposed between a positive electrode plate 3 and a negative electrode plate 4. The positive electrode plate 3 itself represents one embodiment of a plate according to the present invention.

Figure 3:
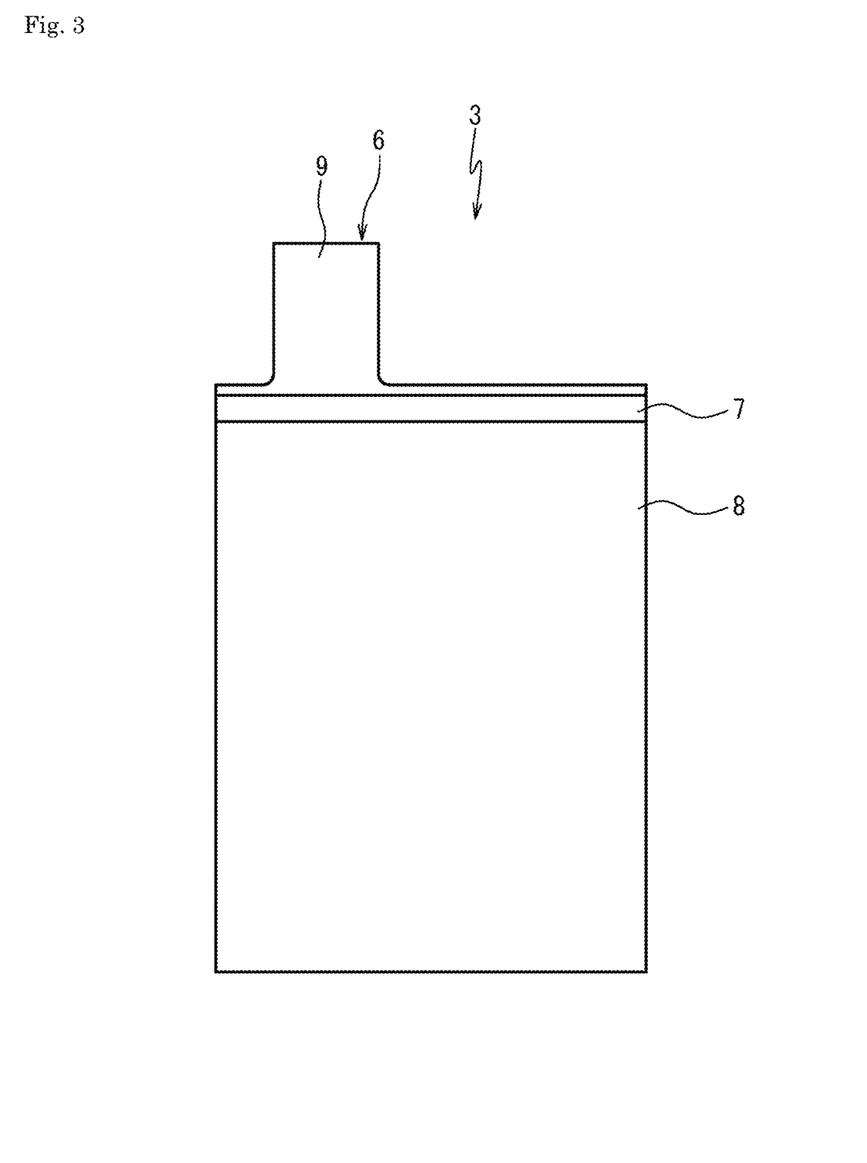
FIG. 3 is a schematic plan view of a positive electrode plate of the electrode assembly in FIG. 2.
Figure 4:
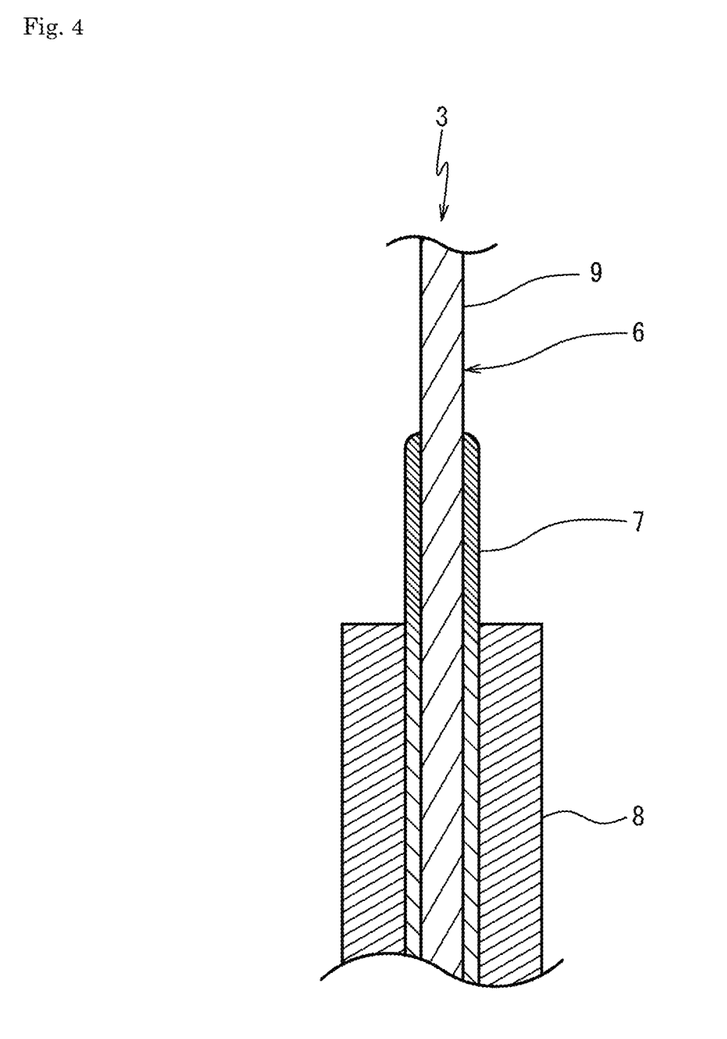
FIG. 4 is a schematic partially-enlarged sectional view of the positive electrode plate in FIG. 3.

The positive electrode plate 3 includes, as shown in FIGS. 3 and 4, a positive current collector 6, an intermediate layer 7 layered on both surfaces of the positive current collector 6, and a positive active material layer 8 layered on a surface of the intermediate layer 7 that is opposed to the positive current collector 6.

The positive current collector 6 includes a plan-view rectangular active material region having the positive active material layer 8 layered thereon and a positive tab 9 extending from the active material region in a small-width band shape.

Used as a material for the positive current collector 6 are metals such as aluminum, iron, and nickel or alloys thereof. Among these materials, aluminum and an aluminum alloy are more preferable for balance between their high conductivity and costs. Examples of a form of the positive current collector 6 include a foil and a deposited film, and a foil is preferable in terms of costs. That is, an aluminum foil is preferable as the positive current collector 6. Examples of aluminum and the aluminum alloy include A1085P and A3003P specified in JIS H4000 (2014).

A lower limit of the average thickness of the positive current collector 6 is preferably 5 µm, more preferably 10 µm. On the other hand, an upper limit of the average thickness of the positive current collector 6 is preferably 40 µm, more preferably 20 µm. With the average thickness of the positive current collector 6 set at the above lower limit or higher, it is possible to impart sufficient strength to the positive current collector 6. With the average thickness of the positive current collector 6 set at the above upper limit or lower, it is possible to increase energy density of the electrode assembly 1.

The intermediate layer 7 is interposed between the positive current collector 6 and the positive active material layer 8 to improve adhesion strength of the positive active material layer 8 to the positive current collector 6. The intermediate layer 7 has conductivity to electrically connect the positive current collector 6 to the positive active material layer 8.

When excessive heating of the energy storage device that does not occur in normal use but is caused by some factors causes thermal contraction of the separator 5, the intermediate layer 7 prevents the positive current collector 6 from directly contacting with the negative electrode plate 4 to inhibit short-circuit current by electric resistance of the intermediate layer 7. Therefore, the intermediate layer 7 is preferably layered on a whole region opposite to the negative electrode plate 4, of the positive current collector 6.

The intermediate layer 7 contains a plurality of conductive particles, a plurality of insulating particles, and a binder for these particles. The intermediate layer 7 preferably further contains an aggregation inhibitor for adjusting aggregation of the insulating particles. The intermediate layer 7 may further contain an additive such as a thickener or a flame retardant.

The intermediate layer 7 has no positive active material layer 8 layered on at least a portion of an end edge thereof, particularly a part thereof layered on the positive tab 9, with the portion or the part exposed so as to be opposite to the negative electrode plate 4. The intermediate layer 7 has a higher mass content of the insulating particles in the exposed region having no positive active material layer 8 layered thereon than that in a layered region having the positive active material layer 8 layered thereon.

The intermediate layer 7 can be formed by coating the positive current collector 6 with a coating solution and drying the coating solution, the coating solution being prepared by dispersing the conductive particles and the insulating particles in a binder solution prepared by dissolving the binder in a solvent. Appropriate adjustment of aggregability of the insulating particles in the coating solution is considered to enable, due to a coffee ring effect, formation of the exposed region having a high mass content of the insulating particles in an outer edge portion of a coated region during drying. The "coffee ring effect" refers to a phenomenon where the amount of evaporation of a dispersion medium increases in an outer edge of a coated region to concentrate and aggregate a dispersoid in an outer edge portion of the coated region, so that the dispersoid is intensively left in the outer edge portion after drying.

A lower limit of surface resistance in the layered region of the intermediate layer 7 is preferably 0.03 mΩ/□, more preferably 0.05 mΩ/□. On the other hand, an upper limit of surface resistance in the layered region of the intermediate layer 7 is preferably 40 mΩ/□, more preferably 20 mΩ/□. With the surface resistance in the layered region of the intermediate layer 7 set at the above lower limit or higher, it is possible to sufficiently increase the surface resistance in the exposed region. With the surface resistance in the layered region of the intermediate layer 7 set at the above upper limit or lower, it is possible to sufficiently reduce loss by internal resistance of the energy storage device. The surface resistance in the layered region of the intermediate layer 7 is measured by a four-terminal method using MCP-TESTER LORESTA-FP (manufactured by Mitsubishi Petrochemical Co., Ltd.).

A lower limit of surface resistance in the exposed region of the intermediate layer 7 is preferably 500 mΩ/□, more preferably 1Ω/□. On the other hand, an upper limit of surface resistance in the exposed region of the intermediate layer 7 is preferably 200Ω/□, more preferably 100Ω/□. With the surface resistance in the exposed region of the intermediate layer 7 set at the above lower limit or higher, it is possible to sufficiently inhibit short-circuit current when the exposed region of the intermediate layer 7 contacts with the negative electrode plate 4. With the surface resistance in the exposed region of the intermediate layer 7 set at the above upper limit or lower, it is possible to sufficiently reduce the surface resistance in the layered region of the intermediate layer 7. The surface resistance in the exposed region of the intermediate layer 7 is measured by a four-terminal method using MCP-TESTER LORESTA-FP (manufactured by Mitsubishi Petrochemical Co., Ltd.).

A lower limit of the average thickness of the intermediate layer 7 is preferably 0.5 μm, more preferably 1 μm. On the other hand, an upper limit of the average thickness of the intermediate layer 7 is preferably 20 μm, more preferably 5 μm. With the average thickness of the intermediate layer 7 set at the above lower limit or higher, it becomes easy to increase the mass content of the insulating particles in the region having no positive active material layer 8 layered thereon and thus it is possible to improve productivity of the positive electrode plate 3. With the average thickness of the intermediate layer 7 set at the above upper limit or lower, it is possible to reduce the thickness of the positive electrode plate 3 and thus increase energy density of the energy storage device.

The conductive particles contained in the intermediate layer 7 guarantees conductivity between the positive current collector 6 and the positive active material layer 8.

Examples of the conductive particles in the intermediate layer 7 include carbon materials such as graphite, furnace black, acetylene black, and ketjen black, metals such as iron, nickel, copper, aluminum, gold, and silver, and conductive ceramic. Among these materials, carbon materials are particularly suitably used in terms of easily differentiating behavior of the conductive particles from behavior of the insulating particles described layer in a dispersion medium. Examples of the carbon materials used as the conductive particles include carbon blacks such as furnace black, acetylene black, and ketjen black, and graphite.

A lower limit of the average particle size of the conductive particles in the intermediate layer 7 is preferably 0.001 μm, more preferably 0.003 μm. On the other hand, an upper limit of the average particle size of the conductive particles in the intermediate layer 7 is preferably 1 μm, more preferably 0.5 μm. With the average particle size of the conductive particles in the intermediate layer 7 set at the above lower limit or higher, the conductive particles can easily disperse in the coating solution for forming the intermediate layer 7 to give constant electric resistance in the layered region. With the average particle size of the conductive particles in the intermediate layer 7 set at the above upper limit or lower, it is possible to form the intermediate layer 7 with even thickness. The "average particle size" means an average value of equivalent circle diameters of particles measured in an image observed with a microscope in accordance with Z8827-1 (2008).

A lower limit of the content rate of the conductive particles in the whole intermediate layer 7 is preferably 3% by mass, more preferably 5% by mass. On the other hand, an upper limit of the content rate of the conductive particles in the whole intermediate layer 7 is preferably 40% by mass, more preferably 30% by mass. With the content rate of the conductive particles in the whole intermediate layer 7 set at the above lower limit or higher, it is possible to secure conductivity of the intermediate layer 7. With the content rate of the conductive particles in the whole intermediate layer 7 set at the above upper limit or lower, it is possible to sufficiently increase electric resistance in the exposed region of the intermediate layer 7.

The insulating particles contained in the intermediate layer 7 adjust conductivity of the intermediate layer 7 to increase electric resistance particularly in the exposed region of the intermediate layer 7 and thus inhibit short-circuit current when the separator 5 contracts to bring the positive electrode plate 3 into contact with the negative electrode plate 4.

Examples of the insulating particles in the intermediate layer 7 include zinc oxide, titanium oxide, iron oxide, aluminum oxide, boron nitride, aluminum nitride, aluminum hydroxide, silicon oxide, and polyolefins (PE, PP, and PTFE). Among these materials, metal oxides are suitably used in terms of easily differentiating behavior of the insulating particles from behavior of the conductive particles described above in a dispersion medium, and aluminum oxide is particularly suitably used among the metal oxides.

A lower limit of the average particle size of the insulating particles in the intermediate layer 7 is preferably 0.01 μm, more preferably 0.10 μm. On the other hand, an upper limit of the average particle size of the insulating particles in the intermediate layer 7 is preferably 10 μm, more preferably 5 μm. With the average particle size of the insulating particles in the intermediate layer 7 set at the above lower limit or higher, it is possible to uniformly disperse the insulating particles in the layered region of the intermediate layer 7. With the average particle size of the insulating particles in the intermediate layer 7 set at the above upper limit or lower, it is possible to increase, due to the coffee ring effect, the mass content of the insulating particles in the outer edge portion and thus sufficiently increase electric resistance in the exposed region of the intermediate layer 7. The coffee ring effect tends to increase as the particle size is small, so that the average particle size of the insulating particles in the intermediate layer 7 is more preferably smaller than the average particle size of the conductive particles.

A lower limit of the content rate of the insulating particles in the whole intermediate layer 7 is preferably 40% by mass, more preferably 50% by mass. On the other hand, an upper limit of the content rate of the insulating particles in the whole intermediate layer 7 is preferably 90% by mass, more preferably 85% by mass. With the content rate of the insulating particles in the whole intermediate layer 7 set at the above lower limit or higher, it is possible to sufficiently increase electric resistance in the exposed region of the intermediate layer 7. With the content rate of the insulating particles in the whole intermediate layer 7 set at the above upper limit or lower, it is possible to secure the content rates of the conductive particles and the binder and thus guarantee adhesiveness and conductivity in the layered region.

The binder contained in the intermediate layer 7 connects among the conductive particles and the insulating particles and exerts adhesiveness of the intermediate layer 7 to the positive current collector 6 and the positive active material layer 8.

As the binder contained in the intermediate layer 7, it is possible to use resins such as polyvinylidene fluoride, styrene butadiene rubber, chitosan, polyethylene, polypropylene, polytetrafluoroethylene, and polyacrylic acid.

A lower limit of the content rate of the binder in the whole intermediate layer 7 is preferably 5% by mass, more preferably 10% by mass. On the other hand, an upper limit of the content rate of the binder in the whole intermediate layer 7 is preferably 60% by mass, more preferably 50% by mass. With the content rate of the binder in the whole intermediate layer 7 set at the above lower limit or higher, it is possible to secure strength of the intermediate layer 7. With the content rate of the binder in the whole intermediate layer 7 set at the above upper limit or lower, it is possible to obtain conductivity in the layered region of the intermediate layer 7.

The aggregation inhibitor that can be contained in the intermediate layer 7 has a role of adjusting aggregation of the insulating particles and is capable of forming, due to the coffee ring effect, a region having a high content rate of the insulating particles in the outer edge portion of the intermediate layer 7. It is possible to increase the effect of the aggregation inhibitor by, for example, mixing the insulating particles with the aggregation inhibitor in advance and thus attaching the aggregation inhibitor to surfaces of the insulating particles, so that it is possible to relatively easily form the region having a high content rate of the insulating particles in the outer edge portion of the intermediate layer 7.

As the aggregation inhibitor that can be contained in the intermediate layer 7, it is possible to use various surfactants such as an anionic surfactant, a cationic surfactant, a bipolar surfactant, a non-ionic surfactant, and a polymer surfactant. Particularly suitably used among these surfactants is a polymer surfactant capable of appropriately inhibiting aggregation of the insulating particles.

A lower limit of the content rate of the aggregation inhibitor in the whole intermediate layer 7 is preferably 0.5% by mass, more preferably 1% by mass. On the other hand, an upper limit of the content rate of the aggregation inhibitor in the whole intermediate layer 7 is preferably 5% by mass, more preferably 4% by mass. With the content rate of the aggregation inhibitor set within the above range, it is possible to achieve appropriate adjustment of aggregability of the insulating particles.

As the dispersion medium of the coating solution for forming the intermediate layer 7, anything may be used as long as it is capable of dissolving the binder. Examples of the dispersion medium include organic solvents such as N-methyl-2-pyrrolidone and toluene, and water, and these dispersion media are used alone or in a mixture of a plurality thereof.

A lower limit of the content rate of solid content in the coating solution for forming the intermediate layer 7 is preferably 10% by mass, more preferably 15% by mass. On the other hand, an upper limit of the content rate of solid content in the coating solution for forming the intermediate layer 7 is preferably 30% by mass, more preferably 25% by mass. With the content rate of solid content in the coating solution for forming the intermediate layer 7 set at the above lower limit or higher, it is possible to secure the thickness of the intermediate layer 7 and thus appropriately adjust electric resistance in the layered region. With the content rate of solid content in the coating solution for forming the intermediate layer 7 set at the above upper limit or lower, it is possible to relatively increase the content rate of the insulating particles in the exposed region due to the coffee ring during drying of the coating solution.

A lower limit of viscosity of the coating solution for forming the intermediate layer 7 is preferably 10 Pa·s, more preferably 100 Pa·s. On the other hand, an upper limit of viscosity of the coating solution for forming the intermediate layer 7 is preferably 10000 Pa·s, more preferably 1000 Pa·s. With the viscosity of the coating solution for forming the intermediate layer 7 set at the above lower limit or higher, it is possible to secure the thickness of the intermediate layer 7 and thus appropriately adjust electric resistance in the layered region. With the viscosity of the coating solution for forming the intermediate layer 7 set at the above upper limit or lower, it is possible to perform even coating, eventually enabling formation of the intermediate layer 7 with even thickness. The viscosity of the coating solution is a value measured using a B-type viscometer. In detail, the viscosity is to be a value measured using an equivalent type of machine to Model TVB-15 (manufactured by TORI SANGYO CO., LTD.), with a No. 3 rotor, at a rotation rate of 12 rpm, and after 3 minutes.

An upper limit of a dry period for drying the coating solution for forming the intermediate layer 7 (a period necessary for reducing the content rate of the dispersion medium to 10% by mass or less) is preferably 20 minutes, more preferably 10 minutes. With the dry period for drying the coating solution for forming the intermediate layer 7 set at the above upper limit or lower, it is possible to improve production efficiency of the positive electrode plate 3.

The aggregation inhibitor has a possibility of bonding to both the conductive particles and the insulating particles. Therefore, the aggregation inhibitor is considered to be capable of appropriately adjusting aggregability of the insulating particles by, depending on the content rate of the aggregation inhibitor, mixing the aggregation inhibitor with one of the conductive particles and the insulating particles in advance for preferential bonding of the aggregation inhibitor to surfaces of the one of the conductive particles and the insulating particles.

The positive active material layer 8 is formed of a so-called positive mixture containing a positive active material. The positive mixture for forming the positive active material layer 8 contains an optional component such as a conducting agent, a binder, or a thickener as necessary.

Examples of the positive active material include composite oxides represented by $Li_xMO_y$ (M represents at least one transition metal) (e.g., $Li_xCoO_2$, $Li_xNiO_2$, $Li_xMn_2O_4$, $Li_xMnO_3$, $Li_xNi_{oc}Co(1-\alpha)O_2$, $Li_xNi\alpha Mn\beta Co(1-\alpha-\beta)O_2$, and $Li_xNi\alpha Mn(2-\alpha)O_4$), and polyanion compounds represented by $Li_wMe_x(XO_y)_z$ (Me represents at least one transition metal and X represents, for example, P, Si, B, or V) (e.g., $LiFePO_4$, $LiMnPO_4$, $LiNiPO_4$, $LiCoPO_4$, $Li_3V_2(PO_4)_3$, $Li_2MnSiO_4$, and $Li_2CoPO_4F$). Another element or anion species may be substituted for a part of the elements or the polyanions in these compounds. As the positive active material layer 8, these compounds may be used alone or in a mixture of two or more thereof. A crystal structure of the positive active material is preferably a layered structure or a spinel structure.

A lower limit of the content rate of the positive active material in the positive active material layer 8 is preferably 50% by mass, more preferably 70% by mass, further preferably 80% by mass. On the other hand, an upper limit of the content rate of the positive active material is preferably 99% by mass, more preferably 94% by mass. With the content rate of the positive active material set at the above lower limit or higher, it is possible to increase energy density of the electrode assembly 1. With the content rate of the positive active material set at the above upper limit or lower, it is possible to secure strength of the positive active material layer 8.

The conducting agent is not particularly limited as long as it is a conductive material that does not adversely affect battery performance. Examples of such a conducting agent include natural or artificial graphite, carbon blacks such as furnace black, acetylene black, and ketjen black, a metal, and conductive ceramic. Examples of a shape of the conducting agent include powder and a fiber.

A lower limit of the content rate of the conducting agent in the positive active material layer 8 is preferably 0.1% by mass, more preferably 0.5% by mass. On the other hand, an upper limit of the content rate of the conducting agent is preferably 10% by mass, more preferably 5% by mass. With the content rate of the conducting agent set within the above range, it is possible to increase energy density of the electrode assembly 1 and thus the energy storage device.

Examples of the binder include thermoplastic resins such as fluororesin (e.g., polytetrafluoroethylene and polyvinylidene fluoride), polyethylene, polypropylene, and polyimide, elastomer such as ethylene-propylene-diene rubber (EPDM), sulfonated EPDM, styrene butadiene rubber, and fluororubber, and a polysaccharide polymer.

A lower limit of the content rate of the binder in the positive active material layer 8 is preferably 1% by mass, more preferably 2% by mass. On the other hand, an upper limit of the content rate of the binder is preferably 10% by mass, more preferably 5% by mass. With the content rate of the binder set within the above range, it is possible to stably hold the positive active material.

Examples of the thickener include polysaccharide polymers such as carboxymethyl cellulose and methyl cellulose. When the thickener has a functional group reactive with lithium, the functional group is preferably inactivated by, for example, methylation in advance.

A lower limit of the average thickness of the positive active material layer 8 is preferably 10 μm, more preferably 20 μm. On the other hand, an upper limit of the average thickness of the positive active material layer 8 is preferably 200 μm, more preferably 100 μm. With the average thickness of the positive active material layer 8 set at the above lower limit or higher, it is possible to sufficiently activate a positive reaction. With the average thickness of the positive active material layer 8 set at the above upper limit or lower, it is possible to increase energy density of the electrode assembly 1 and thus the energy storage device.

The negative electrode plate 4 includes a conductive foil-shaped or sheet-shaped negative current collector 10 and a negative active material layer 11 layered on a surface of the negative current collector 10. Specifically, the negative electrode plate 4 includes, on the surface of the negative current collector 10, a plan-view rectangular active material region having an active material layer layered thereon, and a negative tab 12 extending from the active material region in a band shape having a smaller width than the width of the active material region, with a gap between the negative tab and the positive tab 9, in the same direction as the positive tab 9.

The negative current collector 10 of the negative electrode plate 4 can have the same configuration as of the positive current collector 6 described above. The material for the negative current collector, however, is preferably copper or a copper alloy. That is, the negative current collector 10 of the negative electrode plate 4 is preferably a copper foil. Examples of the copper foil include a rolled copper foil and an electrolytic copper foil.

The negative active material layer 11 is formed of a so-called negative electrode plate mixture containing a negative active material. The negative electrode plate mixture for forming the negative active material layer 11 contains an optional component such as a conducting agent, a binder, a thickener, or a filler as necessary. As for the optional component such as a conducting agent, a binder, a thickener, or a filler, it is possible to use the same component as that in the positive active material layer 8.

Suitably used as the negative active material is a material capable of storing and releasing lithium ions. Specific examples of the negative active material include metals such as lithium and a lithium alloy, a metal oxide, a polyphosphoric acid compound, and carbon materials such as graphite, amorphous carbon (graphitizable carbon or non-graphitizable carbon).

A lower limit of the content rate of the negative active material in the negative active material layer 11 is preferably 60% by mass, more preferably 80% by mass, further preferably 90% by mass. On the other hand, an upper limit of the content rate of the negative active material is preferably 99% by mass, more preferably 98% by mass. With the content rate of the negative active material set within the above range, it is possible to increase energy density of the electrode assembly 1 and thus the energy storage device.

A lower limit of the content rate of the binder in the negative active material layer 11 is preferably 1% by mass, more preferably 5% by mass. On the other hand, an upper limit of the content rate of the binder is preferably 20% by mass, more preferably 15% by mass. With the content rate of the binder set within the above range, it is possible to stably hold the negative active material.

A lower limit of the average thickness of the negative active material layer 11 is preferably 10 μm, more preferably 20 μm. On the other hand, an upper limit of the average thickness of the negative active material layer 11 is preferably 200 μm, more preferably 100 μm. With the average thickness of the negative active material layer 11 set at the above lower limit or higher, it is possible to sufficiently activate a negative reaction. With the average thickness of the negative active material layer 11 set at the above upper limit or lower, it is possible to increase energy density of the electrode assembly 1 and thus the energy storage device.

The separator 5 is interposed between the positive electrode plate 3 and the negative electrode plate 4 to prevent the positive electrode plate 3 from directly contacting with the negative electrode plate 4 and has the inside thereof impregnated with the electrolyte solution to enable delivery of charge between the positive electrode plate 3 and the negative electrode plate 4 via ions.

The separator 5 can be formed of a porous resin film. The separator 5 may include an oxidation resistance layer or a heat resistance layer on at least one surface of the porous resin film (preferably a surface opposite to the positive electrode plate 3) and may include, as an outermost layer, an adhesive agent layer for bonding the separator 5 to the positive electrode plate 3 or the negative electrode plate 4.

As a main component of the porous resin film for forming the separator 5, it is possible to utilize, for example, polyethylene, polypropylene, an ethylene-vinyl acetate copolymer, and an ethylene-methyl acrylate copolymer. Among these components, suitably used as the main component of the porous resin film for forming the separator 5 are polyethylene and polypropylene that are excellent in electrolyte solution resistance and durability. The "main component" means a component having a highest mass content.

A lower limit of the average thickness of the porous resin film for forming the separator 5 is preferably 5 µm, more preferably 10 µm. On the other hand, an upper limit of the average thickness of the porous resin film for forming the separator 5 is preferably 30 µm, more preferably 20 µm. With the average thickness of the porous resin film for forming the separator 5 set at the above lower limit or higher, it is possible to secure strength of the separator 5. With the average thickness of the porous resin film for forming the separator 5 set at the above upper limit or lower, it is possible to increase energy density of the electrode assembly 1 and thus the energy storage device.

The oxidation resistance layer or the heat resistance layer of the separator 5 is a layer provided to inhibit the porous resin film for forming the separator 5 from being oxidized and thus deteriorated, and contains many inorganic particles and a binder that connects among the inorganic particles.

Examples of a main component of the inorganic particles include alumina, silica, zirconia, titania, magnesia, and boehmite. Among these components, aluminum, silica, and titania are particularly preferable as the main component of the inorganic particles in the oxidation resistance layer or the heat resistance layer.

A lower limit of the average particle size of the inorganic particles in the oxidation resistance layer or the heat resistance layer is preferably 1 nm, more preferably 7 nm. On the other hand, an upper limit of the average particle size of the inorganic particles is preferably 5 µm, more preferably 1 µm. With the average particle size of the inorganic particles set at the above lower limit or higher, it is possible to reduce the proportion of the binder in the oxidation resistance layer or the heat resistance layer and thus increase heat resistance of the oxidation resistance layer or the heat resistance layer. With the average particle size of the inorganic particles set at the above upper limit or lower, it is possible to form the oxidation resistance layer or the heat resistance layer that is uniform.

A lower limit of the average thickness of the oxidation resistance layer or the heat resistance layer is preferably 2 µm, more preferably 4 µm. On the other hand, an upper limit of the average thickness of the oxidation resistance layer or the heat resistance layer is preferably 6 µm, more preferably 5 µm. With the average thickness of the oxidation resistance layer or the heat resistance layer set at the above lower limit or higher, it is possible to secure strength of the oxidation resistance layer or the heat resistance layer. With the average thickness of the oxidation resistance layer or the heat resistance layer set at the above upper limit or lower, it is possible to increase energy density of the electrode assembly 1 and thus the energy storage device.

As the electrolyte solution, an organic electrolyte solution is used that is obtained by dissolving a supporting electrolyte solution in an organic solvent. As the supporting electrolyte solution, a lithium salt is suitably used. The lithium salt is not particularly limited, and examples thereof include LiPF6, LiAsF6, LiBF4, LiSbF6, LiAlCl4, and LiClO4. Among these lithium salts, LiPF6, LiClO4, and CF3SO3Li are particularly preferable that are easily soluble in an organic solvent and exhibit a high degree of dissociation.

The organic solvent used in the electrolyte solution is not particularly limited as long as it is capable of dissolving the supporting electrolyte solution, and it is possible to use, for example, dimethyl carbonate, ethylene carbonate, diethyl carbonate, propylene carbonate, and butylene carbonate alone or in combination of a plurality of them. Among these organic solvents, carbonates are particularly suitably used that have a high dielectric constant and have a wide stable potential region.

The case 2 is a sealing case that houses the electrode assembly 1 and has the electrolyte solution sealed therein.

A material for the case 2 may be, for example, a resin as long as it has sealability enabling sealing of the electrolyte solution and has strength enabling protection of the electrode assembly 1. As the material, however, a metal is suitably used. In other words, the case 2 may be, for example, a bag or the like that is formed of, for example, a laminate film and has flexibility. As the case, however, a hard metal case is preferably used that is capable of more certainly protecting the electrode assembly 1.

The case 2 can be configured to include a case main body 13 having a square cylinder shape with a bottom, and a tabular lid 14 for sealing an opening of the case main body 13. On the lid 14 are disposed a positive external terminal 15 and a negative external terminal 16 that are electrically connected to the positive tab 9 of the positive electrode plate 3 and the negative tab 12 of the negative electrode plate 4, respectively. Specifically, the positive external terminal 15 and the negative external terminal 16 are provided so as to penetrate the lid 14.

The energy storage device is attached to the positive external terminal 15 and the negative external terminal 16 in the case 2, and the lid may further include a positive connection member 17 and a negative connection member 18 that are connected to the positive tab 9 and the negative tab 12 of the electrode assembly 1, respectively.

<Advantages>

The positive electrode plate 3 includes the intermediate layer 7 having a higher content rate of the insulating particles in the exposed region than that in the layered region, to enable the exposed region of the intermediate layer 7 that has a high content rate of the insulating particles and has relatively large electric resistance to interpose between the positive current collector 6 and the negative electrode plate 4 and thus inhibit short-circuit current when excessive heating of the energy storage device that does not occur in normal use but is caused by some factors causes thermal contraction of the separator 5. Further, the exposed region allows foreign matter to attach thereto to prevent the foreign matter from entering into between the plates, so that it is possible to prevent, for example, a short circuit by mixing-in of the foreign matter.

[Other Embodiments]

The embodiment described above does not limit the configuration of the present invention. Accordingly, the embodiment allows omission, substitution, or addition of the constituent elements of each part in the embodiment on the basis of the description of the present specification and technical common knowledge, and those obtained through the omission, the substitution, or the addition are all considered to belong to the scope of the present invention.

The plate according to the present invention may be a negative electrode plate. That is, the negative electrode plate may, similarly to in the positive electrode plate according to the embodiment, include an intermediate layer that is layered between the negative current collector and the negative active material layer and that has a higher mass content of the insulating particles in a region having no negative active material layer layered thereon than that in a region having a negative active material layer layered thereon.

The embodiment has provided a plate including a tab. The plate, however, may be a plate including no tab. For example, when a band-shaped current collector is coated with an intermediate layer and an active material layer, a region (uncoated region) having neither the intermediate layer nor the active material layer coated therewith may be formed in an end in the width direction of the band shape to secure electric connection to an external terminal in the uncoated region.

EXAMPLE

Hereinafter, the present invention is described on the basis of an example. The present invention, however, is not limited to these examples.

Example

Alumina as insulating particles was mixed with N-methyl-2-pyrrolidone in a mass ratio of 50:50 and a polymer surfactant as an aggregation inhibitor was added and mixed in an amount of 4% by mass relative to the mass of alumina, to prepare a preliminary coating solution having a solid content rate of about 50%. To the preliminary coating solution, acetylene black (conductive particles) and polyvinylidene fluoride (binder) were added and mixed in a mass ratio among alumina, acetylene black, and polyvinylidene fluoride of 77:8:15 to obtain an actual coating solution. The actual coating solution was adjusted so as to have a solid content rate of 18%.

Figure 5:
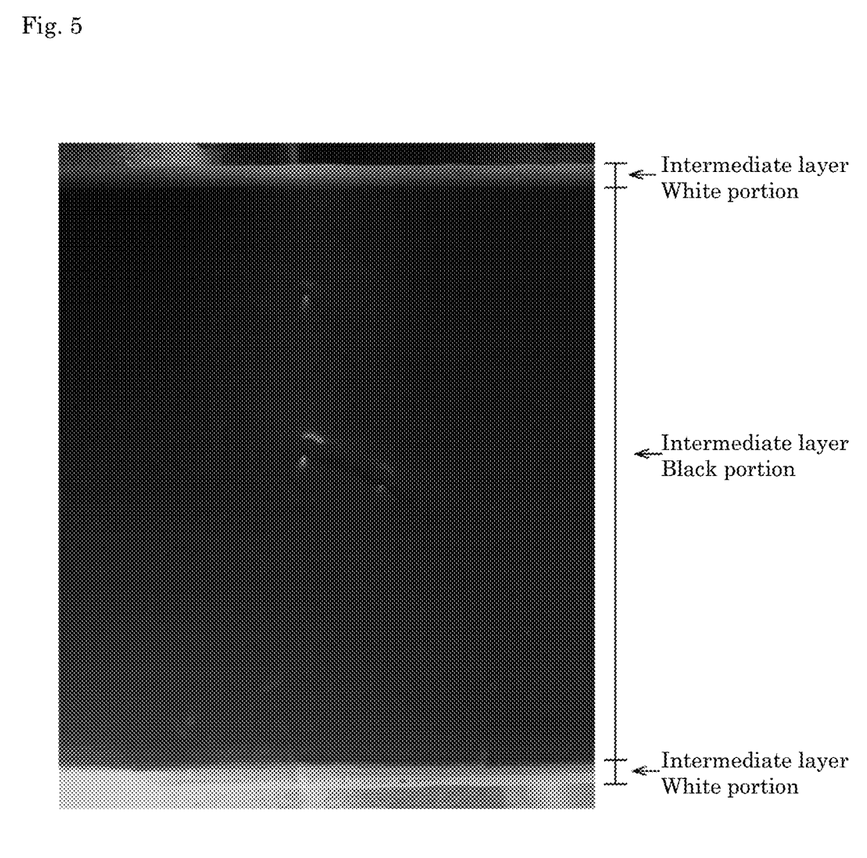
FIG. 5 is a photograph showing an example according to the one embodiment of the present invention.

The actual coating solution was applied to a band-shaped aluminum foil (current collector) with a blade and then dried in a thermostatic chamber at 80° C. for 20 minutes to obtain an aluminum foil of the example. FIG. 5 shows a photograph of the resultant aluminum foil of the example. In the intermediate layer, a center portion is black, whereas an outer edge portion is white, demonstrating a high mass content of alumina in the outliner edge portion portion.

In the example, it is possible to form, by one coating of the intermediate layer, a high conductive region (a region having a low mass content of the insulating particles) and a high resistive region (a region having a high mass content of the insulating particles). That is, it is possible to simultaneously form the high conductive region and the high resistive region, and this example enables more efficient formation of the two regions than that in an aspect where the regions are separately formed.

INDUSTRIAL APPLICABILITY

A plate, an electrode assembly, and an energy storage device according to the present invention are particularly suitably used as a power source of vehicles such as an electric vehicle and a plug-in hybrid electric vehicle (PHEV). The energy storage device according to the present invention can be suitably used for industrial use such as an energy storage system (a large-scale energy storage system and a small-scale energy storage system for domestic use), for example, a distributed power system incorporating natural energy such as sunlight or wind power, a power system for rail, and a power system for an automatic guided vehicle (AGV).

DESCRIPTION OF REFERENCE SIGNS

1 Electrode assembly
2 Case
3 Positive electrode plate (positive plate)
4 Negative electrode plate (counter plate)
5 Separator
6 Positive current collector
7 Intermediate layer
8 Positive active material layer
9 Positive tab
10 Negative current collector
11 Negative active material layer
12 Negative tab
13 Case main body
14 Lid
15 Positive external terminal
16 Negative external terminal
17 Positive connection member
18 Negative connection member

The invention claimed is:

1. A plate comprising:
   a current collector;
   an intermediate layer layered on the current collector; and
   an active material layer layered on the intermediate layer,
   wherein the intermediate layer contains conductive particles and insulating particles,
   wherein at least a portion of an end edge of the intermediate layer is not covered with the active material layer,
   wherein the intermediate layer includes the insulating particles in a region not covered with the active material layer, and the insulating particles in a region covered with the active material layer, and
   wherein a content rate by mass of the insulating particles in the region not covered with the active material layer is higher than a content rate by mass of the insulating particles in the region covered with the active material layer.

2. The plate according to claim 1, wherein the conductive particles comprise a carbon material and the insulating particles comprise alumina.

3. The plate according to claim 1, wherein the intermediate layer further contains an aggregation inhibitor for adjusting aggregation of the insulating particles.

4. An electrode assembly comprising:
   the plate according to claim 1;
   a counter plate that is opposite to the plate and has a different polarity from a polarity of the plate; and a separator interposed between the plate and the counter plate.

5. An energy storage device comprising:
the electrode assembly according to claim 4; and
a case for housing the electrode assembly.

6. The plate according to claim 1, wherein a lower limit of a content rate of the insulating particles in the whole intermediate layer is 40% by mass.

7. The plate according to claim 1, wherein a lower limit of a content rate of the insulating particles in the whole intermediate layer comprises 50% by mass.

8. The plate according to claim 1, wherein an upper limit of a content rate of the insulating particles in the whole intermediate layer comprises 90% by mass.

9. The plate according to claim 1, wherein an upper limit of a content rate of the insulating particles in the whole intermediate layer comprises 85% by mass.

10. The plate according to claim 1, wherein a lower limit of a content rate of the insulating particles in the whole intermediate layer is between 40% and 50% by mass.

11. The plate according to claim 1, wherein an upper limit of a content rate of the insulating particles in the whole intermediate layer is between 85% and 90% by mass.

12. The plate according to claim 1, wherein a content rate of the insulating particles in the whole intermediate layer is between 40% and 90% by mass.

13. The plate according to claim 1, wherein a content rate of the insulating particles in the whole intermediate layer is between 50% and 85% by mass.

14. The plate according to claim 1, wherein a lower limit of an average particle size of the insulating particles in the intermediate layer comprises 0.01 μm.

15. The plate according to claim 1, wherein a lower limit of an average particle size of the insulating particles in the intermediate layer comprises 0.10 μm.

16. The plate according to claim 1, wherein an upper limit of an average particle size of the insulating particles in the intermediate layer comprises 10 μm.

17. The plate according to claim 1, wherein an upper limit of an average particle size of the insulating particles in the intermediate layer comprises 5 μm.

18. The plate according to claim 1, wherein an average particle size of the insulating particles in the intermediate layer is between 0.01 μm and 10 μm.

19. The plate according to claim 1, wherein an average particle size of the insulating particles in the intermediate layer is between 0.10 μm and 5 μm.

20. The plate according to claim 16, wherein, when the average particle size of the insulating particles in the intermediate layer is equal to or lower than the upper limit, a content rate by mass of the insulating particles in the end edge is increased.

* * * * *